US008208432B2

(12) United States Patent
Takashima (10) Patent No.: US 8,208,432 B2
(45) Date of Patent: Jun. 26, 2012

(54) COMMUNICATION EQUIPMENT (75) Inventor: Mitsuhiro Takashima, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 852 days.

(21) Appl. No.: 12/230,757

(22) Filed: Sep. 4, 2008

(65) Prior Publication Data

US 2009/0080379 A1    Mar. 26, 2009

(30) Foreign Application Priority Data

Sep. 25, 2007 (JP) ................................. 2007-246395

(51) Int. Cl.
*H04L 12/28* (2006.01)
*H04W 4/00* (2009.01)
*G06F 15/16* (2006.01)

(52) U.S. Cl. ........ 370/329; 370/328; 370/338; 370/341; 370/395.4; 370/468; 709/207; 709/217; 709/219; 709/224; 709/239

(58) Field of Classification Search .......... 370/328–503; 709/207–239
See application file for complete search history.

(56) References Cited

U.S. PATENT DOCUMENTS

| | | | | | |
|---|---|---|---|---|---|
| 5,347,511 | A | * | 9/1994 | Gun | 370/255 |
| 5,742,594 | A | * | 4/1998 | Natarajan | 370/336 |
| 6,006,269 | A | * | 12/1999 | Phaal | 709/227 |
| 6,055,564 | A | * | 4/2000 | Phaal | 709/207 |
| 6,112,085 | A | * | 8/2000 | Garner et al. | 455/428 |
| 6,167,445 | A | * | 12/2000 | Gai et al. | 709/223 |
| 6,195,417 | B1 | * | 2/2001 | Dans | 379/67.1 |
| 6,219,352 | B1 | * | 4/2001 | Bonomi et al. | 370/417 |
| 6,324,165 | B1 | * | 11/2001 | Fan et al. | 370/232 |
| 6,493,317 | B1 | * | 12/2002 | Ma | 370/237 |
| 6,542,739 | B1 | * | 4/2003 | Garner | 455/427 |

(Continued)

FOREIGN PATENT DOCUMENTS

JP    2003-259447    9/2003

(Continued)

OTHER PUBLICATIONS

3rd Generation Partnership Project; Technical Specification Group Radio Access Network; Physical Channels and Modulation (Release 8), 3GPP TS 36.211 v1.1.0, May 2007, pp. 1-34.

*Primary Examiner* — Ayaz Sheikh
*Assistant Examiner* — Venkatesh Haliyur
(74) *Attorney, Agent, or Firm* — Wenderoth Lind & Ponack, L.L.P.

(57) ABSTRACT

Communication equipment allocates a communication resource region which is used for communication with equipment of a communicating party and performs scheduling of resources. A data classification unit classifies data into small-volume RTD, large-volume RTD or nRTD. Based on the result of the classification, a scheduling unit allocates a communication resource region under a first condition that the RTD has priority over the nRTD, a second condition that the small-volume RTD has priority over the large-volume RTD, a third condition that a previously used communication resource region is, if possible, allocated to the small-volume RTD, and a fourth condition that the large-volume RTD and nRTD are allocated with priority given to equipment of a communicating party for which high communication quality is ensured. A communication unit performs communication with the equipment of the communicating party according to the result of the scheduling.

3 Claims, 5 Drawing Sheets

U.S. PATENT DOCUMENTS

| | | | |
|---|---|---|---|
| 6,567,397 B1 * | 5/2003 | Campana, Jr. et al | 370/349 |
| 6,636,482 B2 * | 10/2003 | Cloonan et al. | 370/230 |
| 6,674,718 B1 * | 1/2004 | Heddes et al. | 370/230 |
| 6,747,976 B1 * | 6/2004 | Bensaou et al. | 370/395.4 |
| 6,804,492 B2 * | 10/2004 | Kay | 455/12.1 |
| 6,850,252 B1 * | 2/2005 | Hoffberg | 715/716 |
| 6,940,831 B1 * | 9/2005 | Omi et al. | 370/310.1 |
| 7,006,472 B1 * | 2/2006 | Immonen et al. | 370/332 |
| 7,283,508 B2 * | 10/2007 | Choi et al. | 370/341 |
| 7,289,514 B2 * | 10/2007 | Robotham et al. | 370/395.4 |
| 7,304,944 B2 * | 12/2007 | Bitar et al. | 370/229 |
| 7,453,844 B1 * | 11/2008 | Lee et al. | 370/329 |
| 7,502,352 B2 * | 3/2009 | Balachandran et al. | 370/338 |
| 7,813,822 B1 * | 10/2010 | Hoffberg | 700/94 |
| 7,898,955 B1 * | 3/2011 | Wang et al. | 370/235 |
| 7,974,714 B2 * | 7/2011 | Hoffberg | 700/94 |
| 2002/0054576 A1 * | 5/2002 | Gobbi | 370/316 |
| 2002/0068545 A1 * | 6/2002 | Oyama et al. | 455/406 |
| 2003/0147371 A1 * | 8/2003 | Choi et al. | 370/341 |
| 2005/0243829 A1 * | 11/2005 | Spencer | 370/394 |
| 2007/0053513 A1 * | 3/2007 | Hoffberg | 380/201 |
| 2009/0080379 A1 * | 3/2009 | Takashima | 370/329 |

FOREIGN PATENT DOCUMENTS

JP          2009077317 A   *   4/2009

* cited by examiner

| No. | Data |
|---|---|
| 1 | Small-volume RTD |
| 2 | Retransmission requested large-volume RTD |
| 3 | Large-volume RTD |
| 4 | Retransmission requested nRTD |
| 5 | nRTD |

COMMUNICATION EQUIPMENT

BACKGROUND OF THE INVENTION

1. Field of the Invention

The present invention relates to communication equipment that performs scheduling for a communicating party (allocation of a communication resource region), or more particularly, to communication equipment that performs scheduling satisfactorily.

2. Description of the Related Art

For example, a radiocommunication system in which the orthogonal frequency division multiplexing (OFDM) method is used to perform radiocommunication between wireless base station equipment (base transceiver station) and terminal equipment has been implemented.

When the OFDM access technique is employed in transmission from the wireless base station equipment to the terminal equipment over a downlink, the wireless base station equipment schedules transmitted data and allocates a frequency range, which is defined on a frequency axis and over which high radiocommunication quality is attained, to the data. Thus, a throughput can be upgraded.

Data to be communicated includes, for example, real-time data (RTD) and non-real-time data (nRTD). The real-time data falls into small-volume real-time data and large-volume real-time data.

To be more specific, the small-volume real-time data having a real-time property, that is, a property that it should be processed in real time includes Voice over IP (VoIP) data. The large-volume data having the real-time property includes streaming data. Moreover, non-real-time data that does not have the real-time property includes file data to be downloaded. For example, data of an image file is large-volume data.

Refer to a patent document (JP-A-2003-259447) and a non-patent document ("3GPP TS" (36.211, V1.1.0, 2007-05)).

However, the foregoing scheduling poses a problem described below.

For example, assuming that scheduling is performed with priority given to terminal equipment (user), for which high radiocommunication quality is attained, in order to upgrade a throughput, when RTD and nRTD coexist, if the nRTD ensures higher radiocommunication quality than the RTD does, the nRTD is scheduled as a top priority. This brings about a possibility that no frequency band is allocated to the RTD. The real-time property of the RTD is impaired.

Moreover, when large-volume RTD ensures higher radiocommunication quality than small-volume RTD does, the large-volume RTD is scheduled as a top priority. This brings about a possibility that no frequency band may be allocated to the small-volume RTD. The real-time accessibility guaranteed for many users who access the small-volume RTD may be impaired.

In contrast, when small-volume RTD ensures higher radiocommunication quality than large-volume RTD does, if the small-volume RTD is frequency scheduled, although the volume of data to be transmitted is small, associated control information is also transmitted. Consequently, an overhead for the control information may increase, and the use efficiency of an uplink (or a downlink) may be degraded.

As control information to be transmitted over a downlink from wireless base station equipment to terminal equipment, for example, information on allocation of a communication resource region (for example, a resource block) is notified. As control information to be transmitted over an uplink from the terminal equipment to the wireless base station equipment, for example, information on release of a communication resource region (for example, a resource block) is notified.

SUMMARY OF THE INVENTION

The present invention is intended to break through the foregoing existing situation. An object of the present invention is to provide communication equipment capable of satisfactorily performing scheduling (allocation of communication resource regions) for a communicating party.

In order to accomplish the above object, according to the present invention, communication equipment that allocates a communication resource region which is used for communication with equipment of a communicating party has a configuration described below.

Specifically, a data classification means classifies data, which is an object of communication in communication with equipment of a communicating party, into small-volume RTD, large-volume RTD, or nRTD. Based on the result of the classification by the data classification means, a scheduling means allocates a communication resource region, which is used for communication with the equipment of the communicating party, under a first condition that the RTD items should have priority over the nRTD, a second condition that the small-volume RTD should have priority over the large-volume RTD, a third condition that a previously used communication resource region should be, if possible, allocated to the small-volume RTD, and a fourth condition that the large-volume RTD and nRTD should be allocated with priority given to equipment of a communicating party for which high communication quality is attained. A communication means performs communication with the equipment of the communicating party according to the result of the scheduling by the scheduling means.

Consequently, when scheduling (allocation of communication resource regions) is performed for a communicating party, the scheduling can be achieved satisfactorily. Specifically, for example, when RTD has priority over nRTD, the real-time property of the RTD can be ensured. When small-volume RTD has higher over large-volume RTD, the real-time accessibility can be ensured for equipment (user) which accesses the small-volume RTD. As for the small-volume RTD, the same communication resource region as that previously used is allocated (that is, a communication resource region is fixed). Consequently, the necessity of communication of control information needed to notify s communication resource region is obviated, and the use efficiency of a frequency band can be upgraded. As for the large-volume RTD and nRTD, priority is given to equipment of a communicating party for which high communication quality can be attained. Thus, a throughput can be upgraded.

The communication equipment may be adapted to various pieces of equipment, for example, communication equipment included in various types of radiocommunication systems, such as, wireless base station equipment and wireless terminal equipment. Moreover, the communication equipment may be adapted to communication equipment for broadcasting.

Moreover, the communication equipment may be adapted to equipment, which communicates (transmits or receives) data according to the OFDM method, in a preferable form.

The communication refers to, for example, radiocommunication. The communication may refer to wired communication.

As the equipment of a communicating party, various types of equipment may be adopted. Moreover, as for the number of pieces of equipment of communicating parties, multiple pieces of equipment are concerned. However, one piece of equipment or no equipment may be concerned in some communicating situations.

Communication for which scheduling (allocation of communication resource regions) is performed by the communication equipment may refer to communication performed in a direction from the communication equipment to equipment of a communicating party, communication performed in a direction from the equipment of the communicating party to the communication equipment, or communications performed in both the directions.

In the communication performed in the direction from the communication equipment to equipment of a communicating party, the condition of data (for example, type of data or the number of data items) that is an object of communication to be performed by the communication equipment can be grasped. In the communication performed in the direction from the equipment of the communicating party to the communication equipment, when the condition of data (for example, type of data or the number of data items) that is requested to be communicated (transmitted) from, for example, the equipment of the communicating party to the communication equipment is notified, the condition of data that is an object of communication (reception) performed by the communication equipment can be grasped.

As the communication resource region, various resource regions may be adopted. For example, a region to be segmented into ranges defined in a frequency direction or a region segmented into ranges defined in the frequency direction and a time direction may be adopted as the communication resource region. The communication resource region may be used as a unit of allocation.

Moreover, as the range defined in the frequency direction, for example, a range specifying part or all of multiple subcarriers according to the OFDM method or the like may be adopted.

Moreover, as the range defined in the time direction, for example, a range specifying part or all of multiple symbols according to the OFDM method or the like may be adopted. As the multiple symbols, for example, the number of symbols to be handled over one slot may be adopted.

Moreover, as the communication resource region, for example, a region of a resource block or a region including one or more resource elements or a predetermined number of resource elements, which is defined according to the OFDM method, may be adopted.

If the communication resource region cannot be segmented in the time direction, the communication resource region may be segmented in the frequency direction alone. Otherwise, the communication resource region may be segmented in both the frequency direction and time direction.

Moreover, the number of communication resource regions to be allocated for equipment of a communicating party may be an arbitrary number of communication resource regions. For example, one or more communication resource regions are employed. No communication region may be employed in some communicating situations. The number of communication resource regions to be allocated for the equipment of the communicating party may be variably controlled according to, for example, the communicating situation.

Moreover, as a technique for classifying data into small-volume RTD, large-volume RTD, or nRTD, various techniques may be adopted. For example, a way of classification may be defined in advance, and may be stored in a memory included in communication equipment. According to a certain classification technique, a data type, that is, small-volume RTD, large-volume RTD, or nRTD is predetermined in association with each service in communication. According to the type of service in which data that is an object of communication is involved, the associated data type (small-volume RTD, large-volume RTD, or nRTD) is identified.

As a technique for allocating, if possible, a previously used communication resource region to small-volume RTD, various techniques may be adopted. For example, a technique of designating a communication resource region, which is used for communication of small-volume RTD, on a fixed basis in relation to each communicating party or each communicating direction may be adopted. Moreover, a technique of employing in principle the same communication resource region as a previously used one for communication of small-volume RTD, and changing the communication resource region to be allocated according to a change in a communicating situation may be adopted. In communication with equipment of a certain communicating party (communication with equipment of a communicating party in either of two directions in which different communication resource regions are employed), if an occasion on which small-volume RTD is communicated for the first time takes place, one of available communication resource regions that is suitable for the communication is selected and allocated.

As information on communication quality, various kinds of information may be adopted. For example, a channel quality indicator of a pilot signal may be adopted as information on received power based on the pilot signal. In general, the amplitude or phase of the pilot signal is set to a reference value and grasped by both a transmitting side and a receiving side.

Moreover, as a technique for scheduling (allocation of communication resource regions), various techniques may be adopted.

Moreover, when multiple pieces of equipment of communicating parties exist, scheduling (allocation of communication resource regions) is performed based on pieces of information on communication qualities, which are received from the pieces of equipment of communicating parties, in consideration of the pieces of equipment of the communicating parties. In general, preferably, scheduling is performed to upgrade communication quality by allocating communication resource regions for the respective pieces of equipment of communicating parties for which high communication quality can be attained.

As mentioned above, according to communication equipment in which the present invention is implemented, when small-volume RTD, large-volume RTD, and nRTD exist as data items that are objects of communication, scheduling (allocation of communication resource regions) can be performed satisfactorily for a communicating party.

DETAILED DESCRIPTION OF THE INVENTION

Referring to the drawings, an embodiment of the present invention will be described below.

To begin with, a resource block (RB), scheduling, and radiocommunication quality (CQI in the present embodiment) will be described below.

Figure 5:
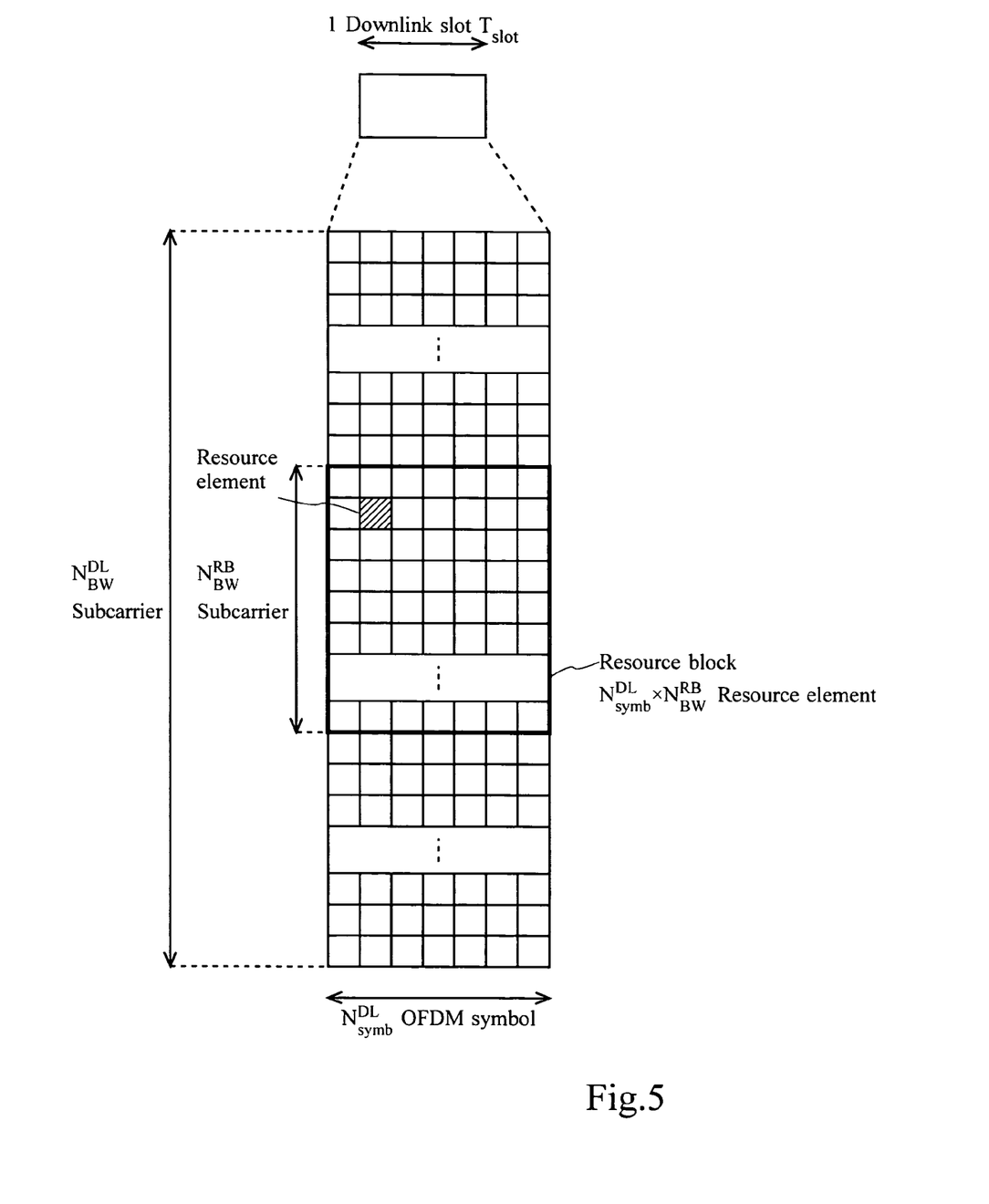
FIG. 5 shows an example of a resource grid defined for a downlink according to the OFDM method.

FIG. 5 shows an example of a resource grid defined for a downlink according to the orthogonal frequency division multiplexing (OFDM) method (refer to the non-patent document). The same resource grid as that for the downlink can be defined for an uplink.

For one downlink slot, $N^{DL}_{symb}$ OFDM symbols are defined in a time direction (on an axis of abscissas in FIG. 5), and $N^{DL}_{BW}$ subcarriers are defined in a frequency direction (on an axis of ordinates in FIG. 5). A region determined with one OFDM symbol and one subcarrier is regarded as a resource element.

Moreover, a region determined with a set of resource elements numbering the product of $N^{DL}_{symb}$ resource elements successively juxtaposed in the direction of OFDM symbols by $N^{DL}_{BW}$ resource elements successively juxtaposed in the direction of subcarriers is regarded as a resource block.

Over successive downlink slots, resource grids having the same structure as that shown in FIG. 5 are continuously communicated.

In this case, the identical resource blocks or resource elements defined for a downlink slot are transmitted during each cycle of the downlink slot unless they are modified.

Wireless base station equipment (base transceiver station (BTS)) performs radiocommunication with multiple pieces of terminal equipment (users) according to the OFDM method.

In scheduling to be performed by the wireless base station equipment, for example, resource blocks to be used for radiocommunication on channels are allocated to the channels supported by piece of terminal equipment.

For example, resource blocks are allocated to a common control channel and data channels. Terminal equipment detects radiocommunication quality (CQI) according to a communicating situation of a pilot signal. Based on the result of the detection, wireless base station equipment performs scheduling for the data channels.

For example, for the common control channel, a pilot signal is allocated to all OFDM symbols and all subcarriers. As for the data channels, data signals are fundamentally allocated to the data channels, and the pilot signal is allocated to frequencies of part of the OFDM symbols and subcarriers.

As a concrete technique of scheduling, various techniques may be adopted. For example, scheduling is performed in a form in which radiocommunication can be performed satisfactorily among wireless base station equipment and multiple pieces of terminal equipment. For example, when the quality (CQI) of radiocommunication of a certain resource block to certain terminal equipment is satisfactory, the resource block is continuously used as it is. If the quality of radiocommunication of a certain resource block to certain terminal equipment is degraded, the resource block is preserved for any other terminal equipment. Any other resource block for which high radiocommunication quality (CQI) can be ensured is allocated for the certain terminal equipment.

Some examples of resource blocks and scheduling techniques have been presented so far. Any other resource block and scheduling technique may be adopted.

For example, instead of a form in which one resource block is allocated to one channel supported by one pieces of terminal equipment, a form in which one resource block is allocated to channels supported by multiple pieces of terminal equipment or a form in which one resource element or an arbitrary number of resource elements is allocated as a unit may be adopted.

Moreover, scheduling is performed on data items to be transmitted from, for example, wireless base station equipment to terminal equipment. The same scheduling may be performed on data items to be transmitted from the terminal equipment to the wireless base station equipment.

In the present embodiment, a CQI is adopted as information representing radio communication quality. The CQI represents a value of the power of a received signal. The larger the CQI is, the higher the radiocommunication quality is.

For example, when allocation is performed in units of a resource block, the value of the power of a pilot signal contained in one resource block is detected as the CQI. When multiple pilot signals are contained in one resource block, a mean value of the powers of the pilot signals may be detected as the CQI.

The CQI is, for example, a discrete digital value ranging, for example, from 1 to 30. In this case, 1 is a lower limit value and 30 is an upper limit value. The definition of the CQI may be arbitrarily determined for each system.

In the present embodiment, a data signal is not used to detect the CQI. If a received data signal contains an error, a receiving side issues a retransmission request to a transmitting side, or requests the transmitting side to raise transmitted power.

In scheduling to be performed by wireless base station equipment, regions to be used for radiocommunications with pieces of terminal equipment (for example, resource blocks) are allocated in consideration of the CQIs relevant to multiple regions (for example, resource blocks) reported from the multiple pieces of terminal equipment. In general, the communication characteristic (for example, frequency characteristic) of certain terminal equipment over a certain frequency range is different from the communication characteristic (for example, frequency characteristic) of any other terminal equipment over the frequency range. The frequency range is therefore allocated for the terminal equipment that exhibits the satisfactory characteristic over the frequency range.

Next, wireless base station equipment of the present embodiment will be described below.

Figure 1:
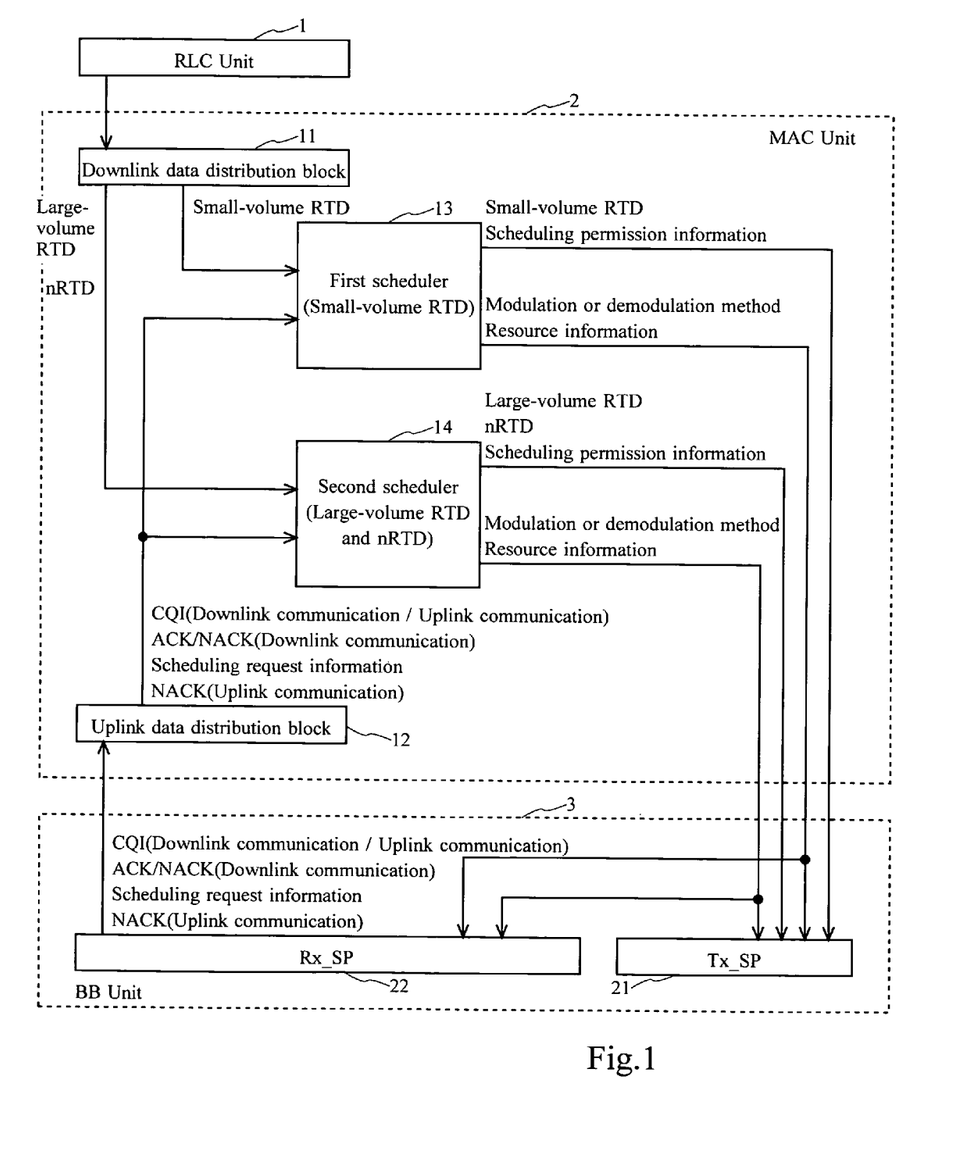
FIG. 1 shows an example of a configuration of wireless base station equipment in accordance with an embodiment of the present invention.

FIG. 1 shows an example of a configuration of the wireless base station equipment of the present embodiment.

The wireless base station equipment of the present embodiment includes a radio link control (RLC) unit 1, a medium access control (MAC) unit 2, and a baseband (BB) unit 3 that processes a baseband signal.

The MAC unit 2 includes a downlink data distribution block 11, an uplink data distribution block 12, a first scheduler 13, and a second scheduler 14.

The BB unit 3 includes a transmitted signal processing facility block (Tx_SP) 21 and a received signal processing facility block (Rx_SP) 22.

In the present embodiment, communication services include a service of communicating small-volume real-time data (small-volume RTD) such as Voice over IP (VoIP) data, a service of communicating large-volume real-time data (large-volume RTD) such as streaming data of an image, and a service of communicating non-real-time data (nRTD) such as an image file.

In the present embodiment, the association of a type of data that is an object of communication (VoIP data, streaming data, or an image file) with a type of service (communication of small-volume RTD, communication of large-volume RTD, or communication of nRTD) is stored in advance in a memory included in the wireless base station equipment.

An example of an operation to be performed by the wireless base station equipment of the present embodiment will be described below.

Wireless packet communication over a downlink from the wireless base station equipment to terminal equipment (user) will be described below.

The RLC unit 1 transmits packet data (transmitted packet data), which is an object of transmission to the terminal equipment, to the downlink data distribution block 11.

The downlink data distribution block 11 classifies the transmitted packet data, which is received from the RLC unit 1, by services. In the present embodiment, the transmitted packet data is distributed to any of three services of communication of small-volume RTD, communication of large-volume RTD, and communication of nRTD. The downlink data distribution block 11 outputs the transmitted packet data, which is small-volume RTD, to the first scheduler (small-volume RTD scheduler) 13, or outputs the transmitted packet data of large-volume RTD or nRTD to the second scheduler (large-volume RTD and nRTD scheduler) 14.

In the present embodiment, the first and second schedulers 13 and 14 perform scheduling in the order of descending priorities assigned to the small-volume RTD, large-volume RTD, and nRTD respectively.

Specifically, first, if small-volume RTD that is an object of scheduling is received from the downlink data distribution block 11, or if data is retransmitted in response to a negative acknowledgement (NACK) signal sent from terminal equipment, which is a communicating party, according to a hybrid automatic repeat request (HARQ) technique, the first scheduler 13 performs scheduling.

In the present embodiment, the uplink data distribution block 12 notifies the first scheduler 13 or second scheduler 14 of a CQI (downlink communication) sent from a communicating party or an acknowledgement (ACK) signal or a negative acknowledgement (NACK) signal (downlink communication) sent from the communicating party.

When the first scheduler 13 performs scheduling for terminal equipment that is a communicating party for the first time, the first scheduler 13 uses a frequency range which is defined on a frequency axis, which has not been allocated to any other small-volume RTD, and over which the highest CQI is ensured (a resource block shown in FIG. 5 in the present embodiment), determines small-volume RTD, a modulation method, and resource information, transmits the small-volume RTD, information on the modulation method, and the resource information to the transmitted signal processing facility block 21, and thus designates the small-volume RTD, information on the modulation method, and resource information.

As the modulation method (and demodulation method), various methods may be adopted. For example, the quadrature phase shift keying (QPSK) method or quadrature amplitude modulation (QAM) method may be adopted. Moreover, the methods may be selectively changed according to radio-communication quality or the like.

Moreover, resource information is information representing an allocated frequency range (in the present embodiment, a resource block).

On the other hand, if scheduling to be performed by the first scheduler 13 for terminal equipment, which is a communicating party, is not the first scheduling to be performed thereby, the first scheduler 13 performs scheduling by allocating a previous (for example, immediately previous) frequency range, determines small-volume RTD, a modulation method, and resource information, transmits the small-volume RTD, information on the modulation method, and the resource information to the transmitted signal processing facility block 21, and thus designates the small-volume RTD, information on the modulation method, and resource information.

In the present embodiment, when small-volume RTD is scheduled, a frequency range determined once is continuously used (allocated). In this case, notification of resource information may be omitted.

Moreover, if small-volume RTD to be scheduled is not sent from the downlink data distribution block 11 and no small-volume RTD is retransmitted, the first scheduler 13 does not perform scheduling.

When the first scheduler 13 completes scheduling of all small-volume RTD items that have to be scheduled, the first scheduler 13 notifies the second scheduler 14 of the fact, and scheduling to be performed by the second scheduler 14 is initiated. Otherwise, the scheduling to be performed by the second scheduler 14 is initiated under the control of an upper-level control unit (not shown).

The second scheduler 14 schedules large-volume RTD and nRTD with priority given to the large-volume RTD.

As for large-volume RTD, the second scheduler 14 allocates a frequency range, over which a high CQI is ensured, to the large-volume RTD with priority given to terminal equipment which is a communicating party, and which has returned a NACK signal and issued a retransmission request according to the HARQ technique. The second scheduler 14 then determines large-volume RTD, a modulation method, and resource information, transmits the large-volume RTD, information on the modulation method, and the resource information to the transmitted signal processing facility block 21, and thus designates the large-volume RTD, modulation method, and resource information.

After scheduling retransmitted large-volume RTD, the second scheduler 14 schedules large-volume RTD sent from the downlink data distribution block 11 with priority given to terminal equipment for which a high CQI is ensured. The second scheduler 14 then determines large-volume RTD, a modulation method, and resource information, transmits the large-volume RTD, information on the modulation method, and the resource information to the transmitted signal processing facility block 21, and thus designates the large-volume RTD, information on the modulation method, and resource information.

After completing scheduling of large-volume RTD items, the second scheduler 14 schedules nRTD items according to the same procedure as it does the large-volume RTD items.

The transmitted signal processing facility block 21 processes a baseband signal of a transmitted signal (a signal of transmitted packet data) according to the information on the modulation method and the resource information designated by the first or second scheduler 13 or 14 of the MAC unit 2. Thereafter, the transmitted signal is transmitted by radio to the terminal equipment that is the communicating party through an antenna (not shown).

The information on the modulation method (information specifying a demodulation method adopted in the terminal equipment) or the resource information is, if necessary, transmitted to the terminal equipment that is the communicating party.

Wireless packet communication over an uplink from terminal equipment (user) to the wireless base station equipment will be described below.

In the present embodiment, the first or second scheduler 13 or 14 performs scheduling for an uplink according to the same procedure as that according to which scheduling is performed for a downlink.

A signal (a signal of packet data) transmitted by radio from terminal equipment that is a communicating party is received through an antenna (not shown) and inputted to the received signal processing facility block 22.

The received signal processing facility block 22 processes the baseband signal of the received signal (signal of received packet data) according to the information on a demodulation method and the resource information which are designated by the first and second schedulers 13 and 14 of the MAC unit 2.

The received signal processing facility block 22 detects information on radiocommunication quality that is associated with each frequency range defined on a frequency axis and used for adaptive modulation or the like, information on the result of transmission (an ACK or NACK signal sent according to the HARQ technique in the present embodiment) to the communicating party which is received from the communicating party, and information on a scheduling request for an uplink issued from the terminal equipment, and outputs the pieces of information to the uplink data distribution block 12.

The uplink data distribution block 12 distributes a CQI inputted from the received signal processing facility block 22, an ACK or NACK signal, and a scheduling request for an uplink in relation to each piece of terminal equipment, and outputs them to the first or second scheduler 13 or 14.

Moreover, when the uplink data distribution block 12 receives the scheduling request for an uplink from the received signal processing facility block 22, the uplink data distribution block 12 classifies the scheduling request by services. In the present embodiment, the uplink data distribution block 12 distributes the scheduling request to any of communication of small-volume RTD, communication of large-volume RTD, and communication of nRTD. In the present embodiment, the scheduling request sent from the terminal equipment contains information on a requested type of service (type of data).

In the present embodiment, the first and second schedulers 13 and 14 perform scheduling in the order of descending priorities assigned to small-volume RTD, large-volume RTD, and nRTD respectively.

Specifically, first, when small-volume RTD (data from terminal equipment to the wireless base station equipment) has to be scheduled in response to a scheduling request sent from the terminal equipment, or when small-volume data has to be retransmitted from the terminal equipment of a communicating party to the own equipment (wireless base station equipment) because the received signal processing facility block 22 has identified a NACK signal according to the HARQ technique, the first scheduler 13 performs scheduling. The NACK (uplink communication) signal is inputted from the received signal processing facility block 22 to the first or second scheduler 13 or 14 via, for example, the uplink data distribution block 12.

When the first scheduler 13 performs scheduling for terminal equipment that is a communicating party for the first time, the first scheduler 13 allocates a frequency range which is defined on a frequency axis, which has not been allocated to any other small-volume RTD, and over which the highest CQI is ensured (a resource block like the one shown in FIG. 5 in the present embodiment). The first scheduler 13 then determines a demodulation method and resource information, and transmits information on the demodulation method and the resource information to the received signal processing facility block 22. Moreover, the first scheduler 13 transmits scheduling permission information to the transmitted signal processing facility block 21, and thus designates the scheduling permission information.

A CQI (uplink communication) for radiocommunication from the terminal equipment to the wireless base station equipment is detected by, for example, the received signal processing facility block 22, and inputted to the second scheduler 14 via the uplink data distribution block 12.

Moreover, the scheduling permission information is information used to notify permission of scheduling.

On the other hand, when scheduling to be performed for terminal equipment, which is a communicating party, by the first scheduler 13 is not the first scheduling, the first scheduler 13 allocates a previously (for example, immediately previously) allocated frequency range, determines a demodulation method and resource information, transmits information on the demodulation method and the resource information to the received signal processing facility block 22, and thus designates the demodulation method and resource information. Moreover, the first scheduler 13 transmits and designates scheduling permission information to the transmitted signal processing facility block 21.

As mentioned above, in the present embodiment, when small-volume RTD is scheduled, a frequency range determined previously is continuously used (allocated). In this case, notification of resource information can be omitted.

When no small-volume RTD has to be scheduled in response to a scheduling request sent from terminal equipment, and no small-volume RTD has to be retransmitted (no data has to be transmitted from the terminal equipment to the wireless base station equipment), the first scheduler 13 does not perform scheduling.

After the first scheduler 13 completes scheduling of all small-volume RTD items that have to be scheduled, the first scheduler 13 notifies the second scheduler 14 of the fact, and scheduling by the second scheduler 14 is initiated. Otherwise, the scheduling by the second scheduler 14 is initiated under the control of an upper-level control unit (not shown).

The second scheduler 14 schedules large-volume RTD and nRTD with priority given to the large-volume RTD.

For scheduling large-volume RTD, the second scheduler 14 allocates a frequency range, over which a high CQI is ensured, with priority given to terminal equipment that has issued a retransmission request (a retransmission request from terminal equipment to the wireless base station equipment) according to the HARQ technique after having a NACK signal identified by the received signal processing facility block 22. The second scheduler 14 then determines a demodulation method and resource information, transmits information on the demodulation method and the resource information to the received signal processing facility block 22, and thus designates the demodulation method and resource information. Moreover, the second scheduler 14 transmits scheduling permission information to the transmitted signal processing facility block 21, and thus designates the scheduling permission information.

Moreover, after the second scheduler 14 schedules retransmitted large-volume RTD, the second scheduler 14 allocates a frequency range to large-volume RTD, for which a scheduling request has been issued from terminal equipment, with priority given to terminal equipment for which a high CQI is ensured. The second scheduler 14 then determines a demodulation method and resource information, and transmits information on the demodulation method and the resource signal to the received signal processing facility block 22, and thus designates the demodulation method and resource information. Moreover, the second scheduler 14 transmits scheduling permission information to the transmitted signal processing facility block 21.

Thereafter, after the second scheduler 14 completes scheduling of large-volume RTD items, the second scheduler 14 schedules nRTD items according to the same procedure as that for the large-volume RTD items.

The transmitted signal processing facility block 21 processes a baseband signal of a transmitted signal containing scheduling permission information designated by the first or second scheduler 13 or 14 of the MAC unit 2. Thereafter, the transmitted signal is transmitted by radio to the terminal equipment that is a communicating party through an antenna (not shown).

Incidentally, information on a demodulation method (information specifying a demodulation method employed in terminal equipment) and resource information are, if necessary, transmitted to the terminal equipment that is the communicating party.

Figure 2:
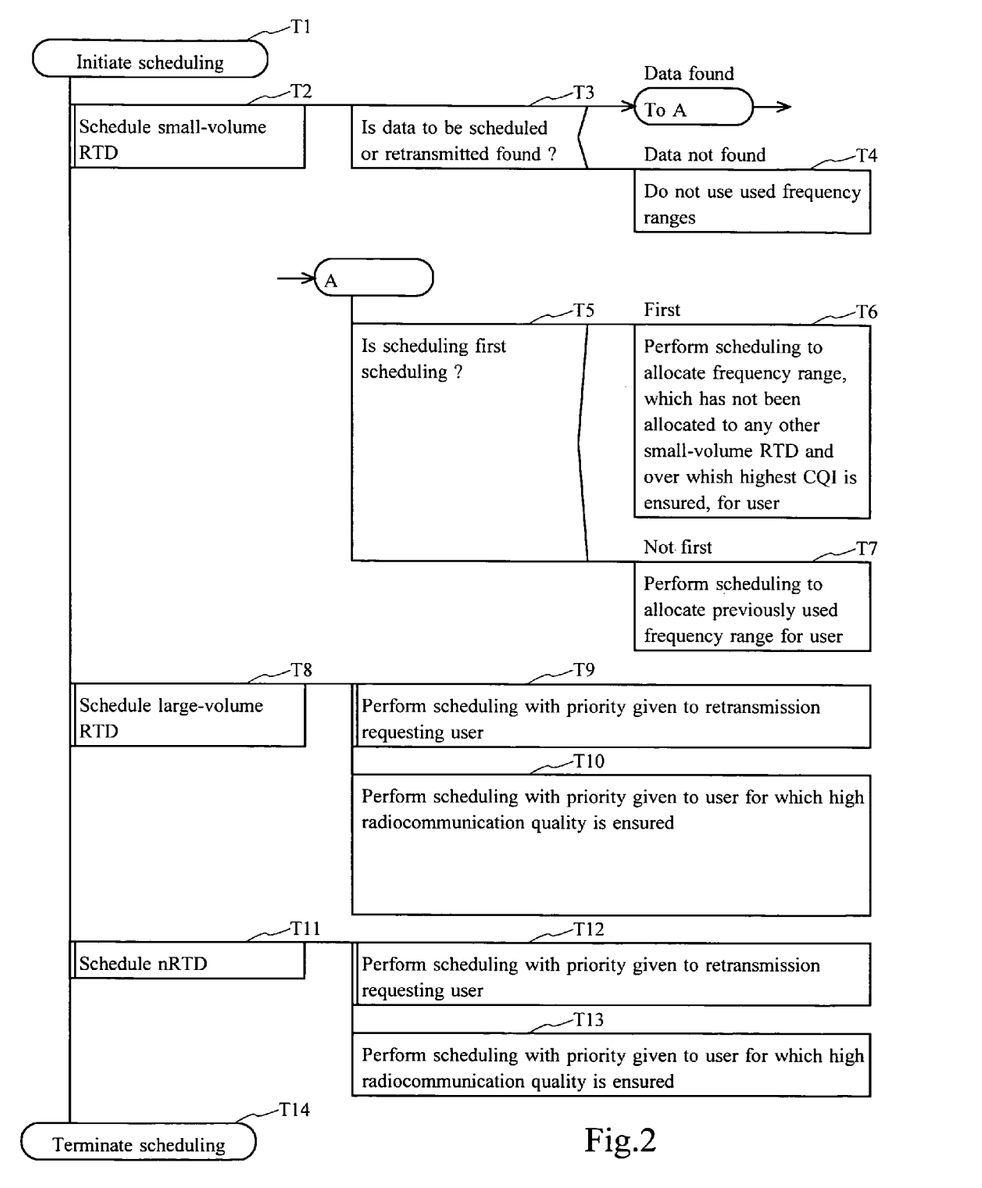
FIG. 2 shows an example of a procedure of scheduling for a downlink.

Referring to FIG. 2, an example of a procedure of scheduling for a downlink to be performed by the wireless base station equipment of the present embodiment will be described below.

When scheduling is initiated (processing T1), scheduling processing of small-volume RTD items to be performed by the first scheduler 13 is initiated (processing T2).

The first scheduler 13 decides whether small-volume RTD to be newly scheduled or small-volume RTD to be retransmitted is found (processing T3). If such data is not found, frequency ranges (for example, resource blocks) that have previously been used for communication of small-volume RTD items are left unused (processing T4). Consequently, frequency ranges usable for communication of small-volume RTD items are determined (in association with pieces of terminal equipment).

On the other hand, if small-volume RTD to be newly scheduled or small-volume RTD to be retransmitted is found, the first scheduler 13 decides whether the scheduling of the small-volume RTD is the first scheduling (processing T5). If the scheduling is the first scheduling, the scheduling is performed so that a frequency range which has not been allocated to any other small-volume RTD and over which the highest CQI is ensured will be allocated for terminal equipment concerned (user) (processing T6). If the scheduling is not the first scheduling, the first scheduler 13 performs scheduling to allocate a previously used frequency range for terminal equipment (user) concerned (processing T7).

Thereafter, scheduling processing of large-volume RTD items to be performed by the second scheduler 14 is initiated (processing T8).

The second scheduler 14 schedules large-volume RTD with priority given to terminal equipment (user) that has issued a retransmission request (processing T9). Thereafter, the second scheduler 14 performs scheduling with priority given to terminal equipment (user) for which high radiocommunication quality (a CQI in the present embodiment) is ensured (processing T10).

Thereafter, scheduling processing of nRTD items by the second scheduler 14 is initiated (processing T11).

The second scheduler 14 schedules nRTD with priority given to terminal equipment (user) that has issued a retransmission request (processing T12). Thereafter, the second scheduler 14 performs scheduling with priority given to terminal equipment (user) for which high radiocommunication quality (a CQI in the present embodiment) is ensured (processing T13).

By performing the foregoing pieces of processing, the entire scheduling processing is terminated (processing T14).

Figure 3:
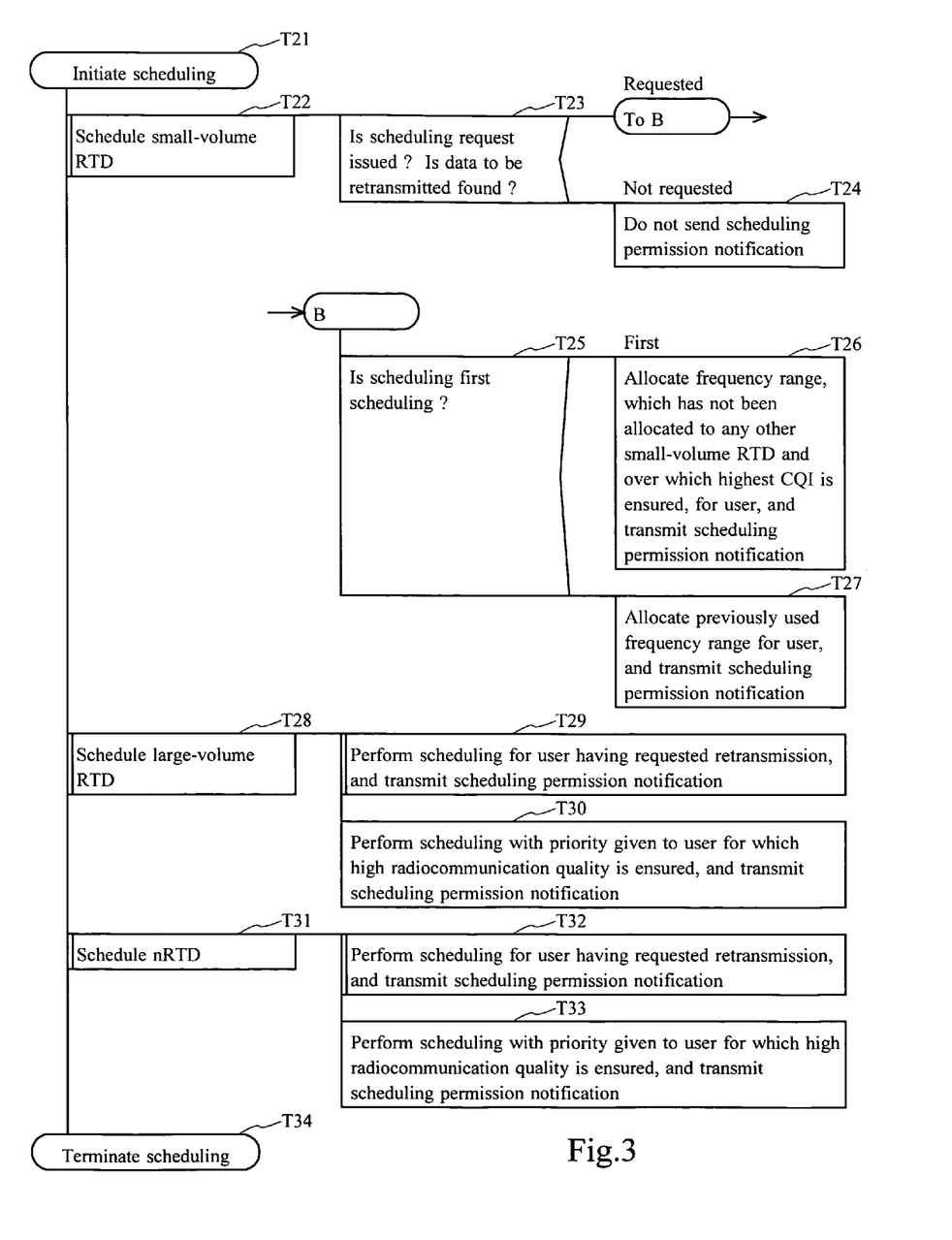
FIG. 3 shows an example of a procedure of scheduling for an uplink.

Referring to FIG. 3, an example of a procedure of scheduling for an uplink to be performed by the wireless base station equipment of the present embodiment will be described.

When scheduling is initiated (processing T21), scheduling processing of small-volume RTD items by the first scheduler 13 is initiated (processing T22).

The first scheduler 13 decides whether small-volume RTD to be newly scheduled or small-volume RTD to be retransmitted is found (processing T23). If such data is not found, scheduling permission information is not notified (processing T24).

In this case, for example, frequency ranges (for example, resource blocks) that have previously been used for communication of small-volume RTD items may be left unused. Consequently, frequency ranges to be used for communication of small-volume RTD items can be determined (in association with pieces of terminal equipment).

On the other hand, if small-volume RTD to be newly scheduled in response to a scheduling request or small-volume RTD to be retransmitted is found, the first scheduler 13 decides whether the scheduling of the small-volume RTD is the first scheduling (processing T25). If the scheduling is the first scheduling, the first scheduler 13 performs scheduling to allocate a frequency range, which has not been allocated to any other small-volume RTD and over which the highest CQI is ensured, for terminal equipment (user) concerned, and transmits a scheduling permission notification (processing T26). If the scheduling is not the first scheduling, the first scheduler 13 performs scheduling to allocate a previously used frequency range to the terminal equipment (user) concerned, and transmits the scheduling permission notification (processing T27).

Thereafter, scheduling processing of large-volume RTD items by the second scheduler 14 is initiated (processing T28).

The second scheduler 14 schedules large-volume RTD with priority given to terminal equipment (user) that has issued a retransmission request, and transmits a scheduling permission notification (processing T29). Thereafter, the second scheduler 14 performs scheduling with priority given to terminal equipment (user) for which high radiocommunication quality (CQI in the present embodiment) is ensured, and transmits the scheduling permission notification (processing T30).

Thereafter, scheduling processing of nRTD items by the second scheduler 14 is initiated (processing T31).

The second scheduler 14 performs scheduling of nRTD with priority given to terminal equipment (user) that has issued a retransmission request, and transmits a scheduling permission notification (processing T32). Thereafter, the second scheduler 14 performs scheduling of nRTD with priority given to terminal equipment (user) for which high radiocommunication quality (CQI in the present embodiment) is ensured, and transmits the scheduling permission notification (processing T33).

By performing the foregoing pieces of processing, the entire scheduling processing is terminated (processing T34).

Figure 4:
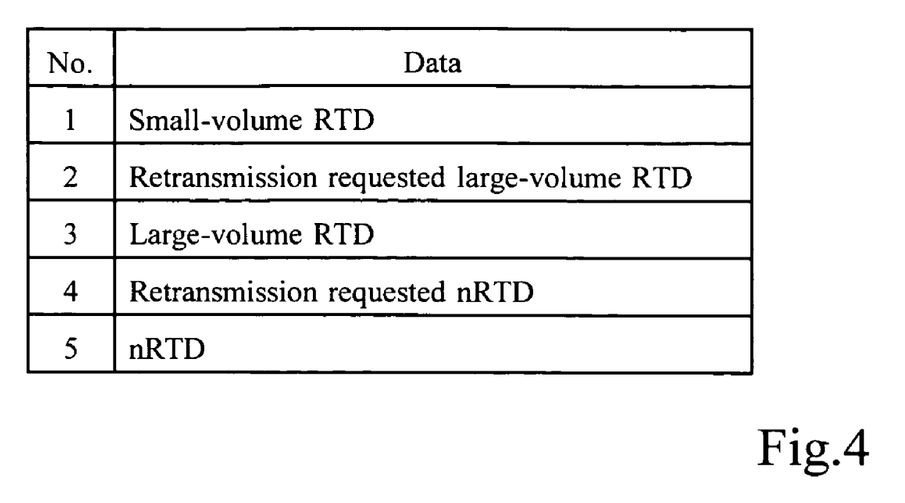
FIG. 4 shows an example of priorities assigned to data categories.

FIG. 4 shows priorities assigned to data categories to be scheduled for a downlink or an uplink according to the present embodiment.

As shown in FIG. 4, in the present embodiment, scheduling is performed in the order of descending priorities that are assigned to small-volume RTD items, retransmission requested large-volume RTD items, large-volume RTD items (whose retransmission is not requested), retransmission requested nRTD items, and nRTD items (whose retransmission is not requested) in that order.

Moreover, in the present embodiment, the wireless base station equipment performs scheduling for both a downlink and an uplink. In this case, information required for scheduling is notified the wireless base station equipment by terminal equipment. Information on the result of scheduling is notified the terminal equipment by the wireless base station equipment.

In the present embodiment, priorities to be assigned to retransmission requested small-volume RTD and small-volume RTD (whose retransmission is not requested) may not especially be determined. For example, a form in which either of the small-volume RTD and small-volume RTD is always given priority may be adopted. Otherwise, instead of giving priority to either of the small-volume RTD and small-volume RTD, either of them for which a scheduling request is issued earlier may be given priority. Any other form may be adopted.

As mentioned above, in the wireless base station equipment of the present embodiment, when small-volume RTD, large-volume RTD, and nRTD are scheduled, the scheduling is performed with a higher priority assigned to the RTD than that to the nRTD, and with a higher priority assigned to the small-volume RTD than that to the large-volume RTD. When the small-volume RTD is scheduled, a previously used frequency range (for example, a resource block) is, if possible, allocated to the small-volume RTD. Thus, the use efficiency of a frequency band can be upgraded while the real-time property of the RTD is retained. Moreover, when the large-volume RTD and nRTD are transferred (transmitted), scheduling is performed with priority given to terminal equipment (user) for which high radiocommunication quality is ensured. Consequently, scheduling can be performed in real time to upgrade a throughput.

As mentioned above, in the wireless base station equipment of the present embodiment, for example, when packet data is scheduled for wireless packet communication, the scheduling is performed in the order of descending priorities that are assigned to small-volume RTD, large-volume RTD, and nRTD in that order. Otherwise, a scheduling method is varied depending on a service (type of data).

Consequently, in the wireless base station equipment of the present embodiment, when data that should be processed in real time is scheduled as a top priority, the real-time property is guaranteed. When small-volume data is scheduled as a top priority, many users can be provided with the relevant service. When scheduling is performed based on a CQI, a throughput or radiocommunication quality over an entire frequency band can be upgraded. In general, scheduling can be performed in real time while ensuring a high throughput.

In the wireless base station equipment (an example of communication equipment) of the present embodiment, a data classification means is realized with the capability of the downlink data distribution block 11 or uplink data distribution block 12 for classifying data (in the case of the uplink data distribution block 12, data whose communication is requested), which is an object of communication, into small-volume RTD, large-volume RTD, or nRTD. A scheduling means is realized with the capability of the first scheduler (small-volume RTD) 13 and second scheduler (large-volume RTD and nRTD) 14 for allocating a communication resource region (for example, a resource block in the present embodiment), which is used for communication with a communicating party (downlink or uplink communication), to the small-volume RTD, large-volume RTD, or nRTD under predetermined conditions. A communication means is realized with the capability of the transmitted signal processing facility block 21 for performing transmission processing according to the result of scheduling or with the capability of the received signal processing facility block 22 for performing reception processing according to the result of scheduling.

The configuration of a system or equipment in which the present invention is implemented is not limited to the aforesaid one. Various configurations may be adopted. Moreover, the present invention may be provided as a method or technique for executing pieces of processing included in the present invention, a program for implementing the method or technique, or a recording medium in which the program is recorded. Moreover, the present invention may be provided as any of various systems or various pieces of equipment.

The field to which the present invention is applied is not limited to the aforesaid one. The present invention can be applied to various fields.

Moreover, various pieces of processing to be performed in a system or equipment in which the present invention is implemented may be controlled according to a control program that is stored in a read-only memory (ROM) in hardware including a processor and a memory and that is run by the processor. Moreover, pieces of functional means for executing the pieces of processing may be constructed as independent hardware circuits.

Moreover, the present invention may be recognized as a recording medium such as a floppy disk (registered mark) or a compact disk (CD) ROM in which the control program is stored so that the control program can be read by a computer, or may be recognized as the program (itself). The control program is loaded from the recording medium into the computer, and run by the processor, whereby the pieces of programs included in the present invention can be executed.

What is claimed is:
1. Communication equipment for allocating a communication resource region which is used for communication with equipment of a communicating party, comprising:
   a data distribution system that classifies data, which is an object of communication in communication with the equipment of the communicating party, into small-volume real-time data (RTD), large-volume RTD, and non-real-time data (nRTD) and distributes the data;
   a first scheduler that based on a result of the distribution by the data distribution system allocates the communication resource region to the small-volume RTD, the first scheduler allocating to the small-volume RTD the communication resource region which has not been allocated to any other small-volume RTD and over which the highest communication quality is ensured, when allocating the communication resource region to the equipment of the communicating party for the first time;
   a second scheduler that allocates the communication resource region to the large-volume RTD and the nRTD, the second scheduler allocating, after the first scheduler completes the allocation of the communication resource region, the communication resource region to the large-volume RTD with priority over the nRTD; and
   a communication system that performs communication with the equipment of the communicating party according to a result of scheduling by the first scheduler and the second scheduler.

2. Communication equipment for allocating a communication resource region which is used when data is transmitted to equipment of a communicating party, comprising:
   a downlink data distribution unit that classifies data, which is transmitted to the equipment of the communicating party, into small-volume real-time data (RTD), large-volume RTD, and non-real-time data (nRTD) and distributes the data;

a first scheduler that based on a result of the distribution by the downlink data distribution unit allocates the communication resource region to the small-volume RTD, the first scheduler allocating to the small-volume RTD the communication resource region which has not been allocated to any other small-volume RTD and over which the highest communication quality is ensured, when allocating the communication resource region to the equipment of the communicating party for the first time;

a second scheduler that allocates the communication resource region to the large-volume RTD and the nRTD, the second scheduler allocating, after the first scheduler completes the allocation of the communication resource region, the communication resource region to the large-volume RTD with priority over the nRTD; and a transmitted signal processing unit that transmits a signal of transmitted data by radio to the equipment of the communicating party according to a result of the scheduling by the first scheduler and the second scheduler.

3. Communication equipment for allocating a communication resource region which is used when data is received from equipment of a communicating party, comprising:

an uplink data distribution unit that classifies a scheduling request, which is received from the equipment of the communicating party, as a scheduling request of small-volume real-time data (RTD), a scheduling request of large-volume RTD, and a scheduling request of non-real-time data (nRTD) and distributes the scheduling request;

a first scheduler that based on a result of the distribution by the uplink data distribution unit allocates the communication resource region to the small-volume RTD, the first scheduler allocating to the small-volume RTD the communication resource region which has not been allocated to any other small-volume RTD and over which the highest communication quality is ensured, when allocating the communication resource region to the equipment of the communicating party for the first time;

a second scheduler that allocates the communication resource region to the large-volume RTD and the nRTD, the second scheduler allocating, after the first scheduler completes the allocation of the communication resource region, the communication resource region to the large-volume RTD with priority over the nRTD; and a received signal processing unit that processes a baseband signal of a signal which is received from the equipment of the communicating party according to a result of the scheduling by the first scheduler and the second scheduler.

* * * * *